United States Patent
Kim et al.

(10) Patent No.: US 7,976,207 B2
(45) Date of Patent: Jul. 12, 2011

(54) BACKLIGHT ASSEMBLY AND DISPLAY DEVICE HAVING THE SAME

(75) Inventors: Hyoung-Joo Kim, Uiwang-si (KR); Sung-Kyu Shim, Seoul (KR); Seung-In Baek, Seoul (KR); Jae-Joong Kwon, Gyeonggi-do (KR); In-Sun Hwang, Suwon-si (KR); Sung-Wook Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 223 days.

(21) Appl. No.: 12/267,097

(22) Filed: Nov. 7, 2008

(65) Prior Publication Data

US 2009/0268484 A1 Oct. 29, 2009

(30) Foreign Application Priority Data

Apr. 24, 2008 (KR) .................. 10-2008-0038276

(51) Int. Cl.
*F21V 7/04* (2006.01)
(52) U.S. Cl. ........ 362/600; 362/615; 362/617; 362/620; 362/97.1; 362/355
(58) Field of Classification Search .............. 362/26–27, 362/600–634, 355, 97.1–97.4; 349/62–65
See application file for complete search history.

(56) References Cited

U.S. PATENT DOCUMENTS

| 5,649,754 | A * | 7/1997 | Matsumoto | 362/618 |
| 6,851,815 | B2 * | 2/2005 | Lee | 362/23 |
| 6,991,359 | B2 * | 1/2006 | Leu et al. | 362/624 |
| 7,108,416 | B1 * | 9/2006 | Osawa | 362/618 |
| 7,114,820 | B1 * | 10/2006 | Parikka et al. | 362/602 |
| 7,440,153 | B2 * | 10/2008 | Lee et al. | 359/15 |
| 7,824,093 | B2 * | 11/2010 | Kim et al. | 362/626 |
| 2007/0242475 | A1 * | 10/2007 | Minobe et al. | 362/608 |
| 2010/0302479 | A1 * | 12/2010 | Aronson et al. | 349/64 |

* cited by examiner

*Primary Examiner* — Robert May
(74) *Attorney, Agent, or Firm* — Innovation Counsel LLP

(57) ABSTRACT

Provided are a backlight assembly and a display device having the same. The backlight assembly includes a light source unit which generates light; and a light guide plate which comprises an incident light surface through which the light from the light source unit enters the light guide plate, an upper surface joined to the incident light surface and that includes a prism pattern, and a lower surface opposing the upper surface and formed with a plurality of concave portions. A diffusing pattern is formed on one of the upper surface and the lower surface.

19 Claims, 15 Drawing Sheets

BACKLIGHT ASSEMBLY AND DISPLAY DEVICE HAVING THE SAME

CROSS-REFERENCE TO RELATED APPLICATION

This application claims priority from Korean Patent Application No. 10-2008-0038276 filed on Apr. 24, 2008 in the Korean Intellectual Property Office, the disclosure of which is incorporated herein by reference in its entirety.

BACKGROUND OF THE INVENTION

1. Field of the Invention

The present invention relates to a backlight assembly and a display device having the same, and more particularly, to a backlight assembly and a display device having the same, in which the generation of dark areas and bright areas is prevented such that light is uniformly supplied.

2. Description of the Related Art

In recent years, there has been an increasing demand for flat panel display devices such as plasma display panel (PDP) devices, plasma-addressed liquid crystal (PALC) display panel devices, liquid crystal display (LCD) devices and organic light-emitting diode (OLED) devices, since conventional cathode ray tube (CRT) devices cannot meet the demand for thin and large-scale display devices.

As the most popular flat panel display (FPD), the LCD includes a pair of substrates formed with electrodes and a liquid crystal layer interposed between the substrates. The liquid crystal molecules of the liquid crystal layer are realigned when a voltage is applied to the electrodes to thereby control the amount of light transmission and display a desired image.

Since the LCD is a non-emissive device, a backlight assembly that includes a light source must be included in the LCD in order to display images. The backlight assembly irradiates light from the rear of a liquid crystal panel, and functions as a surface light source that emits light over the entire area of the liquid crystal panel. Depending on the location of the light source, the backlight assembly is referred to as being either of the direct type or edge type. In the direct-type backlight assembly, the light source is positioned directly below the liquid crystal panel, while in the edge-type backlight assembly, the light source is positioned to the side of the liquid crystal panel and a light guide plate is used to transmit light over the entire area of the liquid crystal panel.

In order to enhance the quality of display devices, there is a need for a backlight assembly that is capable of uniformly supplying light to the display panel.

SUMMARY OF THE INVENTION

Aspects of the present invention provide a backlight assembly which prevents the generation of dark areas and bright areas to thereby uniformly supply light.

Aspects of the present invention also provide a display device having a backlight assembly that prevents the generation of dark areas and bright areas to thereby uniformly supply light.

However, the aspects of the present invention are not restricted to the aspects set forth herein. The above and other aspects of the present invention will become more apparent to one of skill in the art to which the present invention pertains by referencing a detailed description of the present invention given below.

According to an aspect of the present invention, there is provided a backlight assembly including: a light source unit which generates light; and a light guide plate which includes an incident light surface through which the light from the light source unit enters the light guide plate, an upper surface joined to the incident light surface and that includes a prism pattern, and a lower surface opposing the upper surface and including a plurality of concave portions. A diffusing pattern is formed on one of the upper surface and the lower surface.

According to another aspect of the present invention, there is provided a backlight assembly including: a light source unit which generates light; a light guide plate which includes an incident light surface through which the light from the light source unit enters the light guide plate, an upper surface joined to the incident light surface and that has a prism pattern, and a lower surface opposing the upper surface and including a plurality of concave portions; and an optical sheet disposed above the light guide plate and that comprises a first surface and a second surface opposing the first surface. A diffusing pattern is formed on one of the first surface and the second surface.

According to another aspect of the present invention, there is provided a display device including: a display panel which displays an image; and a backlight assembly which includes a light source unit that supplies light to the display panel, a light guide plate which includes an incident light surface through which the light from the light source unit enters the light guide plate, an upper surface joined to the incident light surface and that has a prism pattern, and a lower surface opposing the upper surface and including a plurality of concave portions, and an optical sheet disposed above the light guide plate. A diffusing pattern is formed on one of the light guide plate and the optical sheet.

BRIEF DESCRIPTION OF THE DRAWINGS

The above and other aspects and features of the present invention will become more apparent based on detailed descriptions of exemplary embodiments thereof and with reference to the attached drawings, in which.

DETAILED DESCRIPTION OF THE EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art.

Furthermore, relative terms such as "below," "beneath," or "lower," "above," and "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. The exemplary terms "below" and "beneath" can, therefore, encompass both an orientation of above and below.

Figure 1:
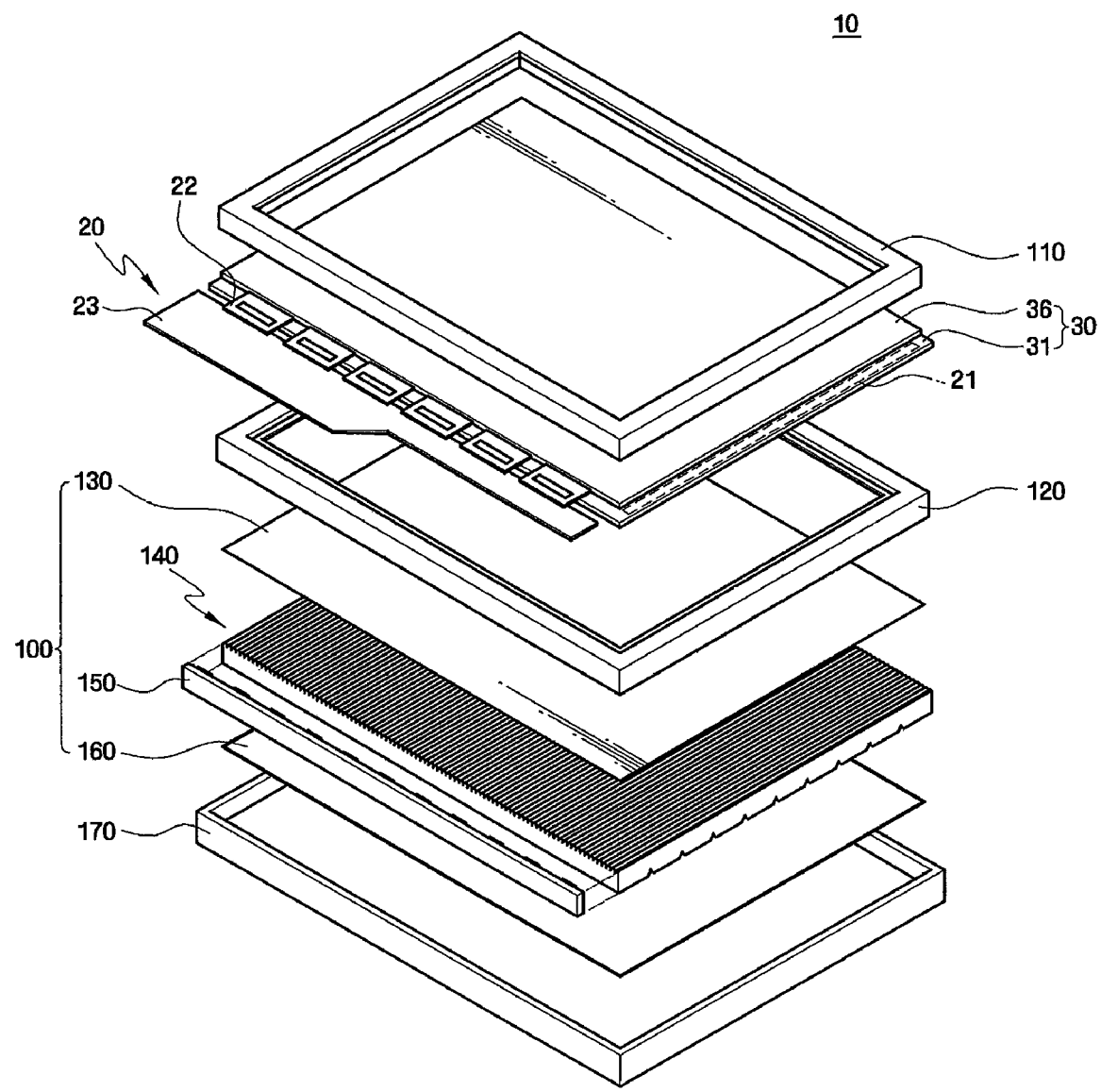
FIG. 1 is an exploded perspective view of a display device according to a first embodiment of the present invention.
Figure 2:
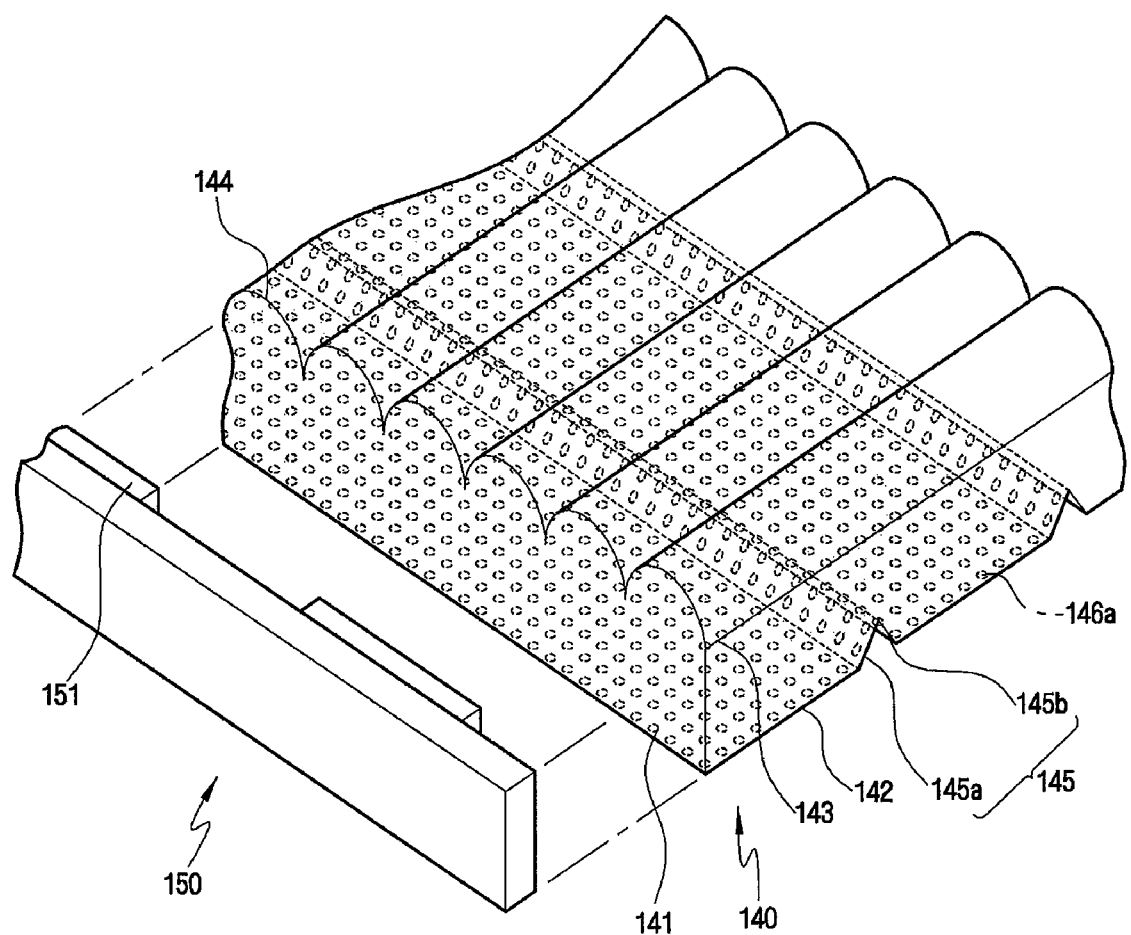
FIG. 2 is a partial perspective view of a light guide plate of FIG. 1.
Figure 3:
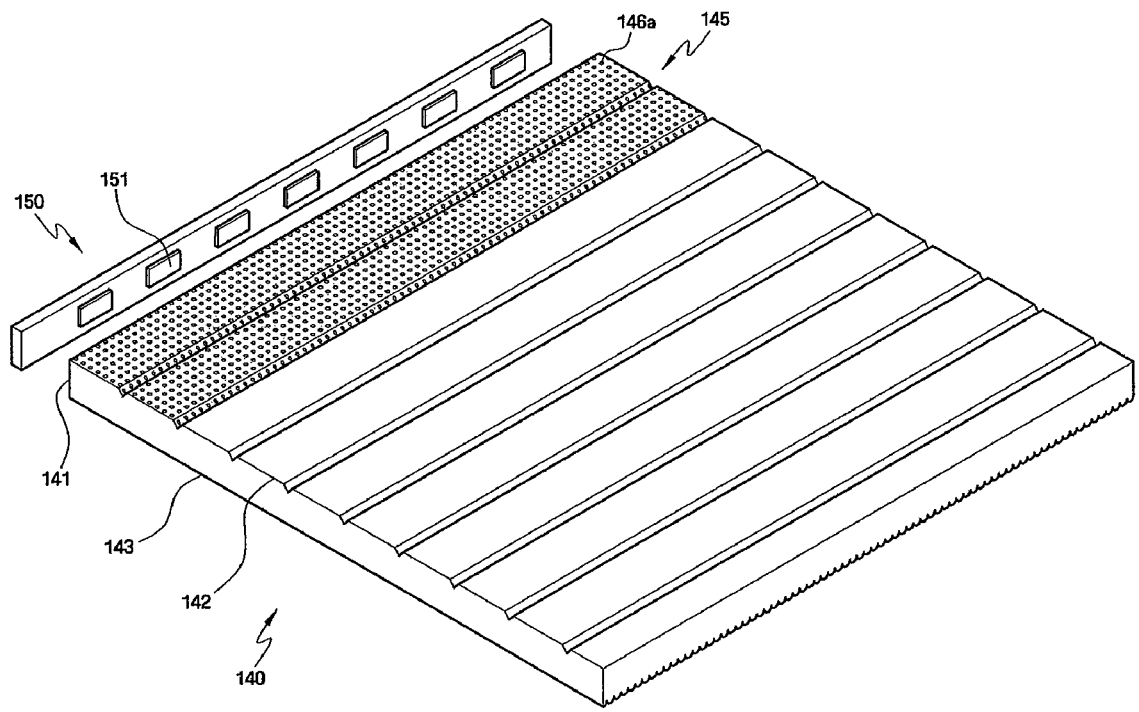
FIG. 3 is a bottom perspective view of the light guide plate of FIG. 1.

A liquid crystal display according to a first embodiment of the present invention will hereinafter be described with reference to FIGS. 1 through 3. FIG. 1 is an exploded perspective view of a display device according to a first embodiment of the present invention, FIG. 2 is a partial perspective view of a light guide plate of FIG. 1, and FIG. 3 is a bottom perspective view of the light guide plate of FIG. 1.

Referring first to FIG. 1, a liquid crystal display 10 according to an embodiment of the present invention includes a liquid crystal panel assembly 20, a backlight assembly 100, an intermediate frame 120, an upper holder 110, and a lower holder 170.

The liquid crystal panel assembly 20 includes a liquid crystal panel 30, a liquid crystal layer (not shown), a gate driver IC (integrated circuit) 21, a data chip film package 22, and a printed circuit board 23.

The liquid crystal panel 30 includes a lower display panel 31 on which are formed gate lines (not shown), data lines (not shown), a thin-film transistor array, and pixel electrodes, and an upper display panel 36, disposed opposite the lower display panel 31, and on which are formed a color filter, a black matrix, and common electrodes. Alternatively, the color filter and the common electrodes may be formed on the lower display panel 31.

The gate driver IC 21 is integrated directly on the lower display panel 31 and is connected to each gate line (not shown) formed on the lower display panel 31. The data chip film package 22 is connected to each data line (not shown) formed on the lower display panel 31. The data chip film package 22 is a semiconductor chip that includes a wiring pattern formed on a base film and a TAB (Tape Automated Bonding) tape which is bonded using the TAB technique. As an example, a tape carrier package (TCP) or a chip on film (COP) may be used for the data chip film package 22. However, these are merely examples and the present invention is not limited in this regard.

The printed circuit board 23 has mounted thereon various driving elements capable of processing gate drive signals and data drive signals, such that gate drive signals may be input to the gate driver IC 21 and data drive signals may be input to the data chip film package 22.

Further, the backlight assembly 100 includes an optical sheet 130, a light guide plate 140, a light source unit 150, and a reflective sheet 160.

The light guide plate 140 guides light supplied from the light source unit 150 to the liquid crystal panel assembly 20, and is made of a panel formed of a plastic-based transparent material such as an acrylic material. The light guide plate 140 functions so that light emitted from the light source unit 150 is directed to the liquid crystal panel 30 which is disposed above the light guide plate 140.

The backlight assembly 100 is of the edge type in this embodiment. Hence, the light source unit 150 is provided in an edge-type configuration in which the light source unit 150 is disposed to one side of the light guide plate 140. The light source unit 150 includes a light source 151.

With additional reference to FIGS. 2 and 3, the light guide plate 140 includes a light incident surface 141, an upper surface 143, a lower surface 142, concave portions 145, and a prism pattern 144. The light incident surface 141 is formed on one side surface of the light guide plate 140 and is adjacent to the light source 151 so that light passes into the light guide plate 140 through the light incident surface 141. The upper surface 143 is perpendicular to the light incident surface 141 and includes the prism pattern 144. The lower surface 142 opposes the upper surface 143 and includes a plurality of the concave portions 145.

The light guide plate 140 includes various patterns such that light entering into the light guide plate 140 through the light incident surface 141 is directed toward the liquid crystal panel 30. Such patterns may include the concave portions 145 formed in the lower surface 142.

The concave portions 145 are formed in the lower surface 142 in a channel-shaped configuration and extend along the same direction as the light incident surface 141. The concave portions 145 include inclined surfaces that reflect light such that a predetermined amount of the light supplied through the light incident surface 141 is reflected to thereby change the path of the light upwardly toward the liquid crystal panel 30. To allow the concave portions 145 to effectively change the light path in this manner, each of the concave portions 145 includes a first inclined surface 145a and a second inclined surface 145b that are able to reflect light. The first inclined surface 145a and the second inclined surface 145b of each concave portion 145 respectively form an oblique angle with the lower surface 142 and meet at a line to be inclined to the upper surface 143. At least one of the first inclined surface 145a and the second inclined surface 145b of each concave portion 145 is directed toward the light incident surface 141. Therefore, a predetermined amount of the light supplied through the light incident surface 141 is reflected by the first inclined surface 145a and supplied to the liquid crystal panel 30. The inclining angle of the first inclined surface 145a of each concave portion 145 may be varied as needed.

The concave portions 145 may be formed such that the spacing between adjacent concave portions 145 is varied as the distance from the light incident surface 141 is increased. Areas, hereinafter called flat surfaces, of the lower surface 142 between the concave portions 145 may be formed parallel to the upper surface 143, or may be angled to form a positive slope or a negative slope with respect to the upper surface 143.

The lower surface 142 cooperates with the upper surface 143 to reflect the light supplied through the light incident surface 141 such that light reaches areas distant from the light incident surface 141. The lower surface 142 may be formed parallel to the upper surface 143. Alternatively, the distance between the lower surface 142 and the upper surface 143 may be tapered in a manner that decreases as the distance from the light incident surface 141 is increased, thereby increasing the distance that the light travels before reflection by a first inclined surface 145a by an amount that is greater than if the lower surface 142 were formed at a predetermined angle. Therefore, light passing through the light incident surface 141 may be more effectively transferred to a greater distance from the light incident surface 141 such that the required amount of light is reflected from the first inclined surfaces 145a of the concave portions 145 and transmitted to the liquid crystal panel 30.

The depths of the concave portions 145 may be varied as needed. The light supplied from the light source 151 is extremely strong near the light incident surface 141, while the light weakens as the distance from the light incident surface 141 is increased. Accordingly, in order to uniformly supply light to the entire area of the liquid crystal panel 30, the fractional amount of light reflected by the concave portions 145 at areas near the light incident surface 141 is made small, while the fractional amount of light reflected by the concave portions 145 is increased in proportion to the distance from the light incident surface 141.

In order to vary the light reflected by the concave portions 145 in this manner, the depths of the concave portions 145 may be varied. Alternatively, the concave portions 145 may be made to the same size (i.e., the same depth) and the density with respect to the number of the concave portions 145 formed within a predetermined area may be increased to thereby make the amount of light that is reflected uniform.

The upper surface 143 of the light guide plate 140 is formed with the prism pattern 144 as described above. The prism pattern 144 focuses the light emitted from the light guide plate 140 such that the light passed through the light guide plate 140 is vertically directed onto the liquid crystal panel 30.

The prism pattern 144 may be formed in an elongated configuration from one side of the light guide plate 140 to the opposite side of the light guide plate 140, and may be formed with a plurality of continuous pattern elements or with a plurality of pattern elements that are spaced apart at a predetermined interval. The cross section of the prism pattern 144 may include elements that are triangular, semicircular, or semielliptical. "Semicircular" as used herein encompasses a shape resembling a part of circle and not necessarily an exact half of a circle, and "semielliptical" as used herein encompasses a shape resembling is a part of an ellipse and not necessarily an exact half of an ellipse.

The cross-sectional shape and area of the prism pattern 144 may be varied as needed. For example, the cross-sectional shape of the prism pattern 144 may be such that semicircular or triangular elements are provided between semielliptical elements, and the cross-sectional area thereof may be such that adjacent elements have different areas.

The lower surface 142 of the light guide plate 140 includes a diffusing pattern 146a for scattering light and preventing the generation of bright dots or areas and dark dots or areas. The diffusing pattern 146a may be formed on the surfaces of the concave portions 145 and on the flat surfaces between the concave portions 145. The diffusing pattern 146a scatters light passing through the inside of the light guide plate 140 to prevent the light from reflecting through the entire inner portion of the light guide plate 140 by multiple reflections and instead allowing the light to exit through the upper surface 143. The diffusing pattern 146a is formed on the lower surface 142 of the light guide plate 140 to perform compensation with respect to locations where bright areas and dark areas form due to the accumulation of light or due to the failure of light to reach certain locations. That is, the diffusing pattern 146a causes variances in the paths of light which, in turn, prevents the generation of dark areas and bright areas due to the resulting light interference.

The diffusing pattern 146a is formed on the lower surface 142 of the light guide plate 140, and may be formed in a concentrated manner near the light incident surface 141. The light guide plate 140 includes the concave portions 145 formed in the lower surface 142 and the prism pattern 144 formed on the upper surface 143, such that the interference of light occurs and bright areas and dark areas are formed near the light incident surface 141. By forming the diffusing pattern 146a near the light incident surface 141, light is uniformly emitted from the entire area of the light guide plate 140. The diffusing pattern 146a may be formed over an area that may extend to about 70 mm from the light incident surface 141.

The diffusing pattern 146a may be formed by treating the lower surface with a sand blaster, or may be formed by depositing a coating that scatters light. The diffusing pattern 146a may be formed over the entire lower surface 142 of the light guide plate 140 or only over an area of the lower surface 142 in the vicinity of the light incident surface 141.

The light source 151 of the light source unit 150 supplies light to the liquid crystal panel 30. One or more light sources 151 may be included in the backlight assembly 100, the light sources 151 being spaced apart in a row along the length of the light source unit 150 with spaces between the light sources 151. A point light source such as a light-emitting diode (LED), or a line light source such as a cold cathode fluorescent lamp (CCFL) or a hot cathode fluorescent lamp (HCFL) may be used for the light sources 151.

The reflective sheet 160 is disposed under the light guide plate 140 and reflects light that is downwardly directed from the light guide plate 140 back in an upward direction. The reflective sheet 160 reflects light that is not internally reflected by the lower surface 142 of the light guide plate 140 and by the concave portions 145 formed therein, and that passes out of the light guide plate 140, such that this light re-enters the light guide plate 140 and possibly passes completely therethrough to the liquid crystal panel 30. Hence, the reflective sheet 160 reduces loss of the light emitted from the light sources 151 and further enhances the uniformity of the light supplied to the liquid crystal panel 30.

The optical sheet 130 is disposed above the light guide plate 140 such that light transmitted through the light guide plate 140 is diffused and focused. The optical sheet 130 may include one or more of the following: a diffusion sheet (not shown), a prism sheet (not shown), and a protection sheet (not shown). The diffusion sheet disperses light received from the light guide plate 140 to prevent the light from being concentrated in some areas. The prism sheet is formed with triangular prisms formed in a predetermined arrangement on an upper surface thereof, such that the light diffused by the diffusion sheet is focused vertically on the liquid crystal panel 30. Accordingly, most of the light passing through the prism sheet travels vertically such that the luminance distribution on the protection sheet is uniform. Further, the protection sheet protects the surface of the prism sheet, and further disperses light to enhance light distribution uniformity.

The liquid crystal display 10 according to an embodiment of the present invention includes the prism pattern 144 such that a single prism sheet or a single protection sheet on the single prism sheet may be used as the optical sheet 130. Further, when a sufficient focusing effect is obtained through the prism pattern 144, a separate prism sheet is unneeded and it is possible to use only the protection sheet.

As described above, the prism pattern 144 is formed on the light guide plate 140, and hence, it is possible to avoid in some cases the use of an additional prism sheet or diffusion sheet.

With reference to FIGS. 1 to 3, the reflective sheet 160, the light source unit 150, the light guide plate 140, and the optical sheet 130 are received, in this order, in the lower holder 170. The lower holder 170 is made of a metal material, and constructed as a chassis, that provides sufficient protection against external shocks and that may be used for grounding purposes.

The intermediate frame 120 includes four side walls that are formed into a rectangular frame configuration. The intermediate frame 120 is lowered downwardly to be mounted surrounding the side walls of the lower holder 170.

The liquid crystal panel 30 is mounted above the protection sheet and is placed within the intermediate frame 120. To prevent damage to the elements secured by the intermediate frame 120, the intermediate frame 120 may be formed as a mold frame of a plastic material.

The upper holder 110 is lowered downwardly to cover the upper surface of the liquid crystal panel 30, which is received in the intermediate frame 120, and attached to the lower holder 170. A window is formed in the upper holder 110 that exposes the liquid crystal panel 30. As in the case of the lower holder 170, the upper holder 110 is made of a metal material, and constructed as a chassis, that provides sufficient protection against external shocks and that may be used for grounding purposes. The upper holder 110 may be attached to the lower holder 170 through a hook connection. Further, the printed circuit board 23 of the liquid crystal panel assembly 20 may extend past and may be bent along the outer side surfaces of the intermediate frame 120 to rest against the side surfaces or bottom surface of the lower holder 170.

Figure 4:
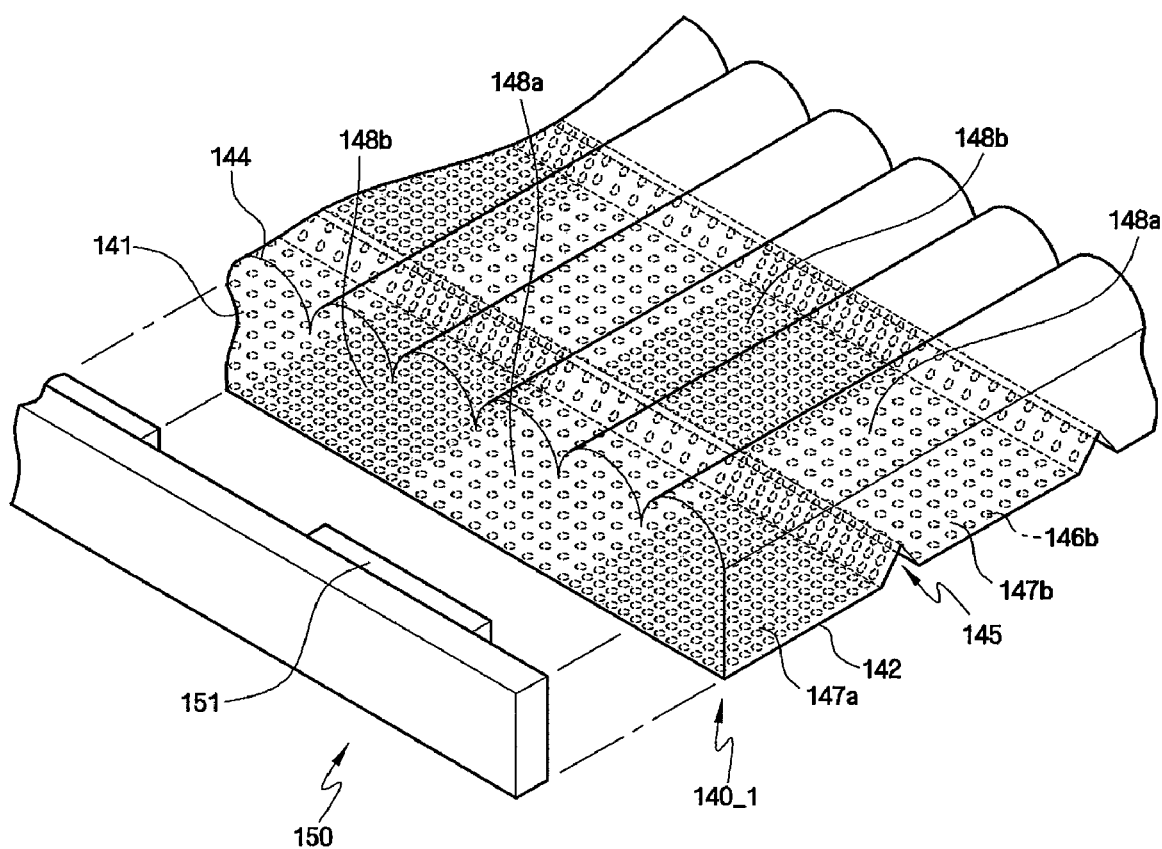
FIG. 4 is a partial perspective view of a light guide plate included in a display device according to a second embodiment of the present invention.
Figure 5:
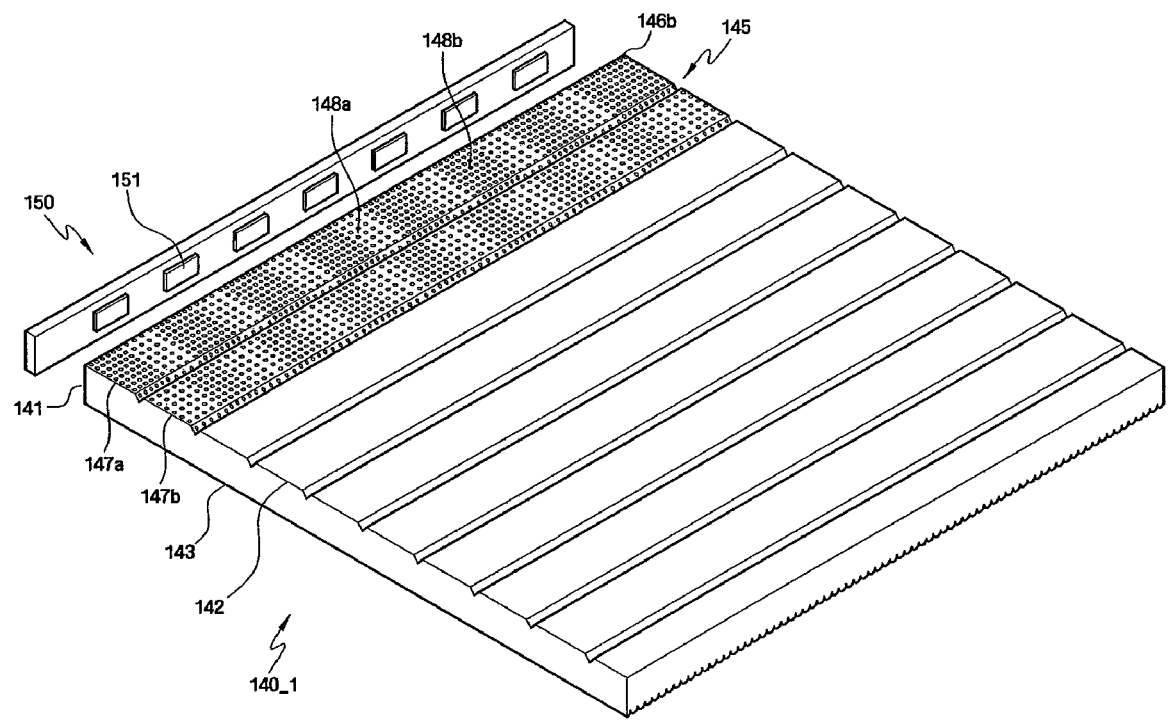
FIG. 5 is a bottom perspective view of the light guide plate of FIG. 4.

A liquid crystal display according to a second embodiment of the present invention will hereinafter be described with reference to FIGS. 4 and 5. FIG. 4 is a partial perspective view of a light guide plate included in a display device according to a second embodiment of the present invention, and FIG. 5 is a bottom perspective view of the light guide plate of FIG. 4. The same reference numerals are used for elements of the second embodiment that are identical in operation and structure as the elements of the first embodiment, and a description of these elements will not be repeated.

In the light guide plate 140_1 included in the liquid crystal display according to the second embodiment of the present invention, the density distribution of the diffusing pattern 146b formed on the lower surface 142 may be adjusted.

The diffusing pattern 146b may be formed mainly near the light incident surface 141 of the light guide plate 140_1. For example, the density of the diffusing pattern 146b in the area adjacent to the light incident surface 141 may be lowered, while the density of the diffusing pattern 146b in an area at a predetermined distance that is further from the light incident surface 141 may be increased. As another example, the density of the diffusing pattern 146b in the area adjacent to the light source 151 may be lowered, while the density of the diffusing pattern 146b in an area at a predetermined distance that is further from the light source 151 may be increased.

The light guide plate 140_1 includes the prism pattern 144 and the concave portions 145 formed respectively on the upper surface 143 and in the lower surface 142 such that the light paths are made complex and random. As a result, bright areas and dark areas may be formed in some areas of the light guide plate 140_1. By forming the diffusing pattern 146b in such a manner that the density of the diffusing pattern 146b at locations where the bright areas are formed is increased, while the density of the diffusing pattern 146b at locations where the dark areas are formed is lowered, the light at the bright areas is scattered by the diffusing pattern 146b and moves to the dark areas. Hence, the uniformity of light over the entire light guide plate 140_1 is increased.

Such a phenomenon (of the formation of bright and dark areas) is caused by reflection and interference of light. Other factors affecting the position, size, and formation of a pattern of bright and dark areas include the thickness of the light guide plate 140_1, and the formations of the prism pattern 144 and the concave portions 145. The density distribution of the diffusing pattern 146b may be varied depending on the location of such bright and dark areas. For example, bright areas may be formed at locations adjacent to the light sources 151 (assuming a plurality of the light sources 151), and dark areas may be formed at locations between the light sources 151. In this case, the density of the diffusing pattern 146b may be increased at the locations adjacent to the light sources 151 and decreased at the locations between the light sources 151.

As shown in FIGS. 4 and 5, the lower surface 142 may include an area 147a that is adjacent to and extends along the length of the light source unit 150 and an area 147b that is adjacent to the area 147a and is separated from the light source unit 150 by the area 147a. The area 147a includes a first row of areas of high density 148a of the diffusing pattern 146b and areas of low density 148b of the diffusing pattern 146b. The first row is adjacent to and parallel to the row of light sources in the light source unit. In the area 147a, the areas of high density 148a may be located opposite light sources 151 and the areas of low density 148b are located between the areas of high density 148a and may be opposite the spaces in the light source unit 150, the areas of high density 148a thus alternating with areas of low density 148b along the length of the area 147a, or equivalently along the length of the light source unit 150.

Area 147b includes a second row of areas of high density 148a alternating with areas of low density 148b. The areas of high density 148a in area 147b are disposed opposite areas of low density 148b in area 147a, and areas of low density 148b in area 147b are disposed opposite areas of high density 148a in area 147a.

The first and second rows may be regarded as rows in a rectangular matrix. The matrix pattern may include additional rows formed in areas similar to areas 147a and 147b with each such additional area including areas of high density of the diffusing pattern 146b alternating with areas of low density of the diffusing pattern 146b.

In an alternative arrangement, in the first row, the areas of low density diffusing pattern may be located opposite lights sources 151 and the areas of high density diffusing pattern 146b may be located opposite spaces in the light source unit 150, and in the second row the pattern is reversed.

The variation in density of the diffusing pattern 146b according to the bright and dark areas is not limited to a matrix pattern, and the diffusing pattern 146b may be radially formed in a manner centered about each of the light sources 151 or may be irregularly formed.

Furthermore, it is not necessary that the diffusing pattern 146b be formed only within an area that is at a predetermined distance from the light incident surface 141, and the diffusing pattern 146b may be formed partly at an area(s) that is at a distance from the light incident surface 141 and partly at an area(s) that is close to the light incident surface 141.

Figure 6:
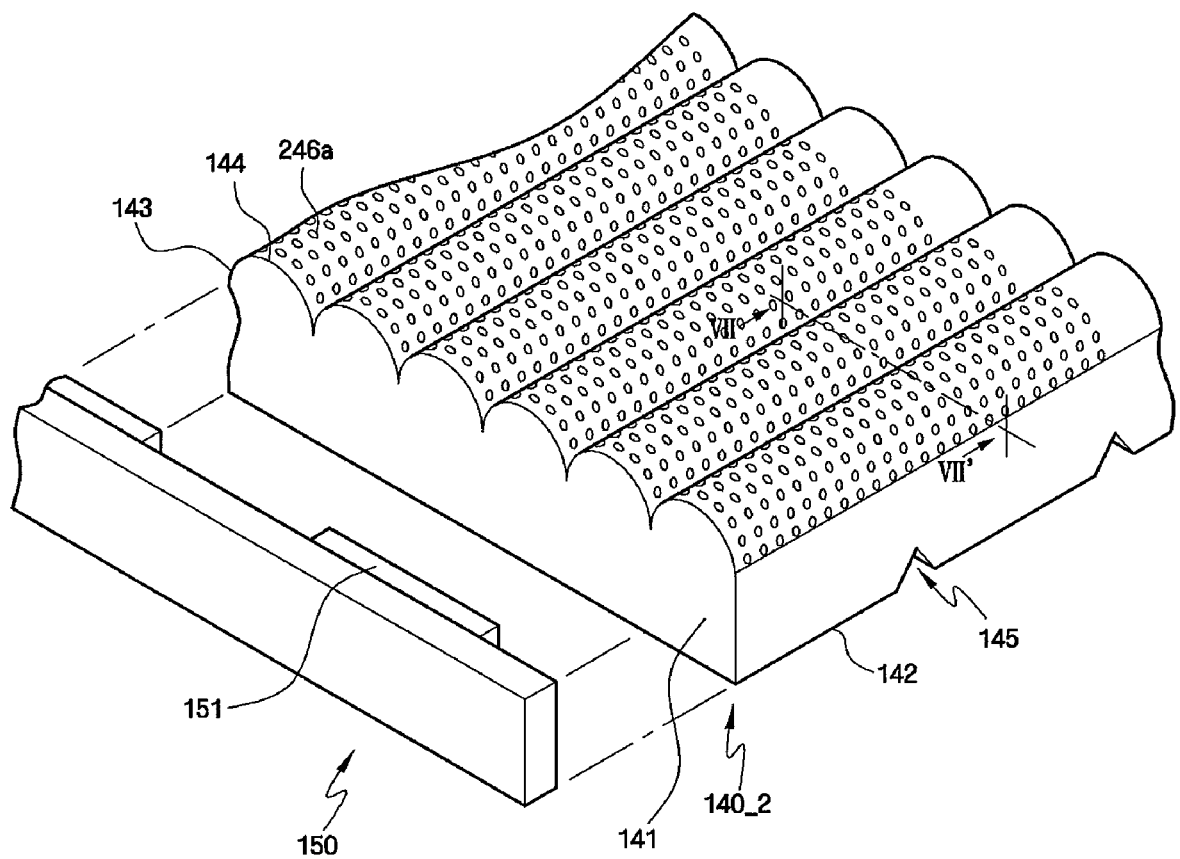
FIG. 6 is a partial perspective view of a light guide plate included in a display device according to a third embodiment of the present invention.
Figure 7:
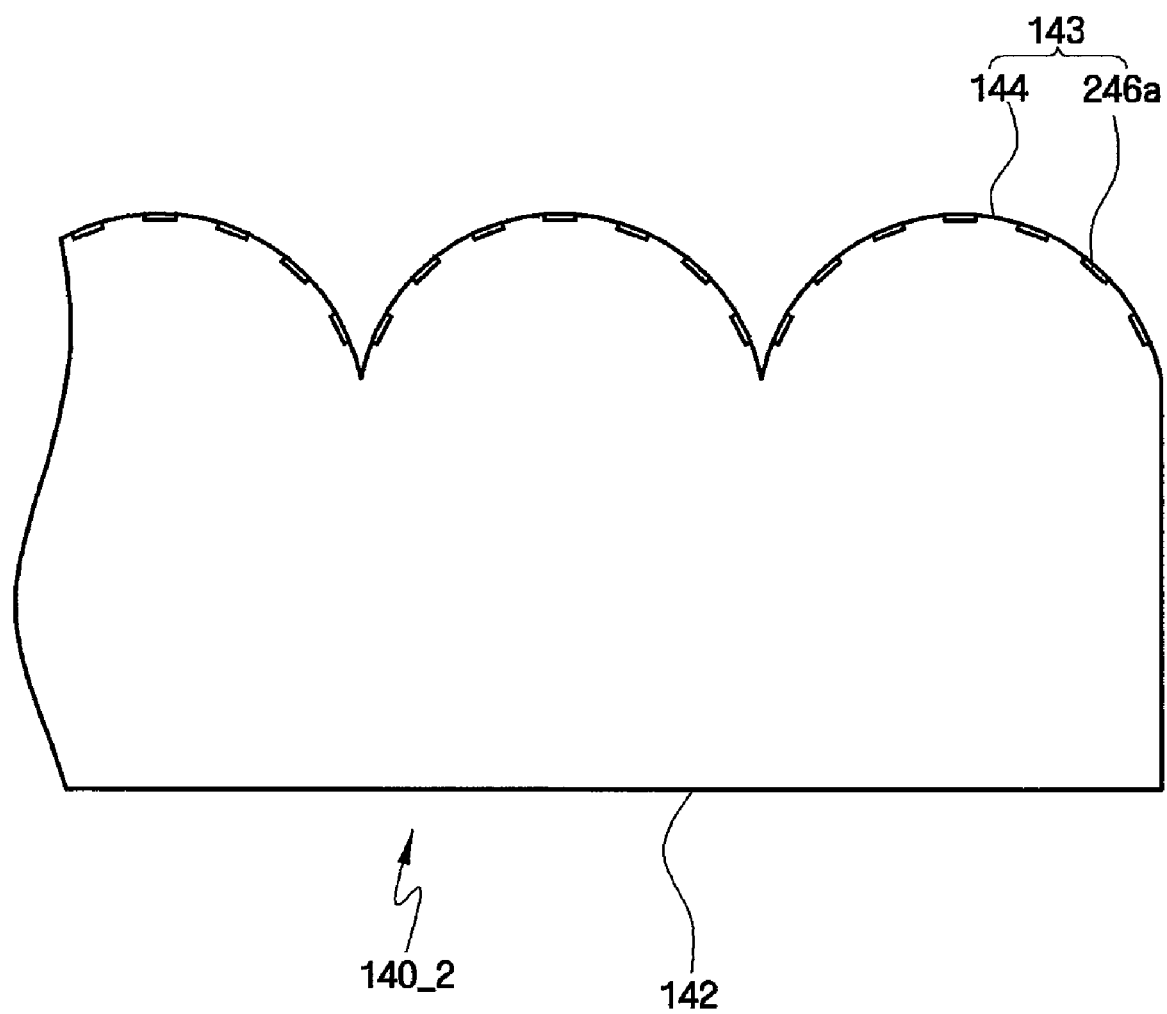
FIG. 7 is a sectional view taken along line VII-VII' of FIG. 6.
Figure 8:
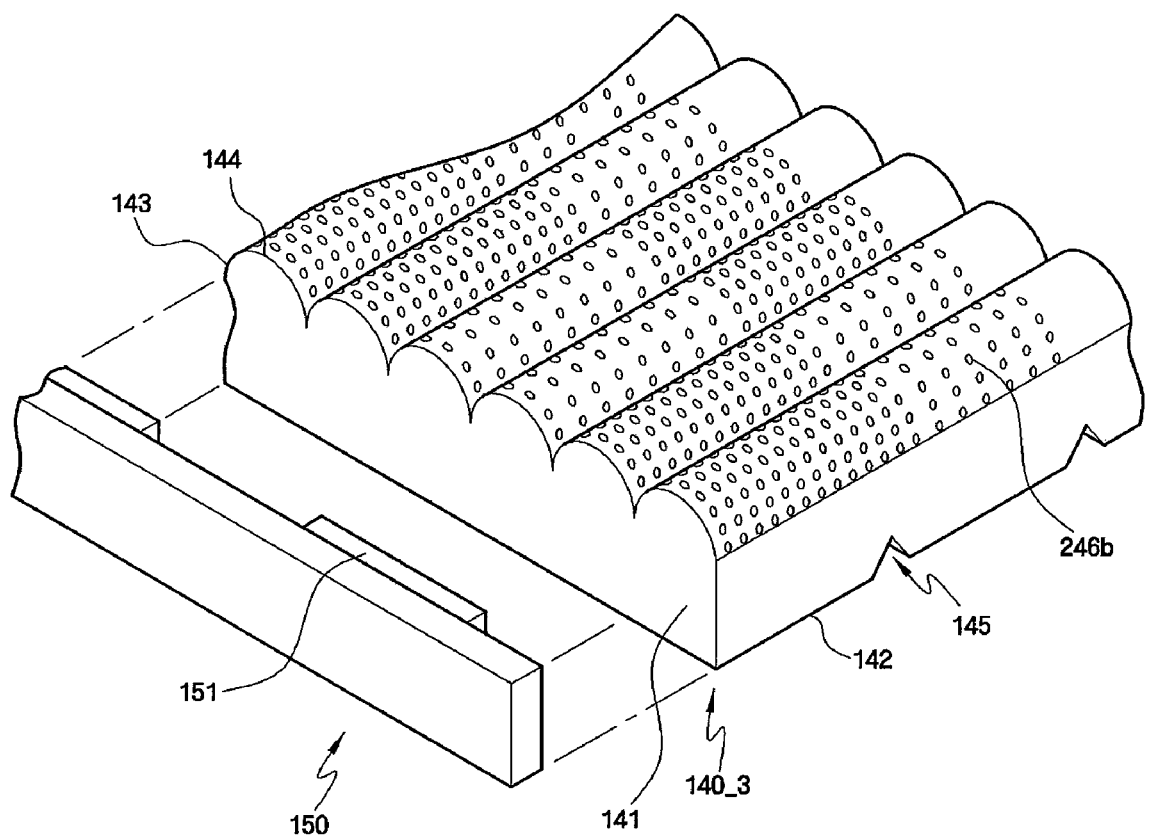
FIG. 8 shows a modified embodiment of the light guide plate of FIG. 6.

A liquid crystal display according to a third embodiment of the present invention will hereinafter be described with reference to FIGS. 6 through 8. FIG. 6 is a partial perspective view of a light guide plate included in a display device according to a third embodiment of the present invention, FIG. 7 is a sectional view taken along line VII-VII' of FIG. 6, and FIG. 8 shows a modified embodiment of the light guide plate of FIG. 6. The same reference numerals will be used for elements of the third embodiment that are identical in operation and structure to the elements of the first embodiment, and a description of these elements will not be repeated.

In the liquid crystal display according to the third embodiment of the present invention, the diffusing pattern 246a of the light guide plate 140_2 is formed on the prism pattern 144.

The prism pattern 144 is formed on the upper surface 143 of the light guide plate 140_2 and has a cross section that is semielliptical in shape. The diffusing pattern 246a is formed on the surface of the prism pattern 144. As in the previous embodiments, due to light interference resulting from the formation of the concave portions 145 in the lower surface 142 of the light guide plate 140_2 and the prism pattern 144 on the upper surface 143, bright areas and dark areas may be formed in the area near the light incident surface 141 of the light guide plate 140_2. By forming the diffusing pattern 246a on the prism pattern 144 which, in turn, is formed on the upper surface 143 of the light guide plate 140_2, the formation of the bright areas and the dark areas may be prevented.

The cross section of the prism pattern 144 may include elements that are triangular, semicircular, or semielliptical. (As described above, "semicircular" encompasses a shape resembling a part of circle and not necessarily an exact half of a circle, and "semielliptical" encompasses a shape resembling is a part of an ellipse and not necessarily an exact half of an ellipse.) The cross-sectional shape of the prism pattern 144 may also be such that elements with different shapes are alternatingly provided in the prism pattern 144. The cross-sectional area of the prism pattern 144 may also be varied as needed.

The diffusing pattern 246a may be formed over only a predetermined portion of the prism pattern 144. That is, the light paths vary depending on the cross-sectional shape of the prism pattern 144, and the diffusing pattern 246a may be formed in areas corresponding to the paths that the light takes. For example, when the prism pattern 144 is formed of elements that are semicircular in cross section, the diffusing pattern 246a may be formed at only the areas in the vicinity of the apexes of the semicircular elements of the prism pattern 144, or may be concentrated at the apexes of the semicircular elements of the prism pattern 144. Alternatively, the diffusing pattern 246a may be omitted at the areas of the apexes of the semicircular elements of the prism pattern 144, or may be formed to a low density at the areas of the apexes of the semicircular elements of the prism pattern 144. As yet another alternative, the diffusing pattern 246a may be formed only in and around the troughs between the elements of the prism pattern 144, or may be formed to a high density in these areas.

Referring to FIG. 8, in the light guide plate 140_3 of this modified embodiment, the density of the diffusing pattern 246b formed on the prism pattern 144 is varied according to position. That is, the density of the diffusing pattern 246b may be changed in a variety of ways depending on the proximity to the light sources 151 (assuming a plurality of the light sources 151). Hence, the diffusing pattern 246b may be formed differently depending on the location of the light sources 151, and may be varied also depending on the formation, size, and positioning of the prism pattern 144 and the concave portions 145.

The matrix pattern described in connection with the second exemplary embodiment of the invention may be applied to the prism pattern 144.

Figure 9:
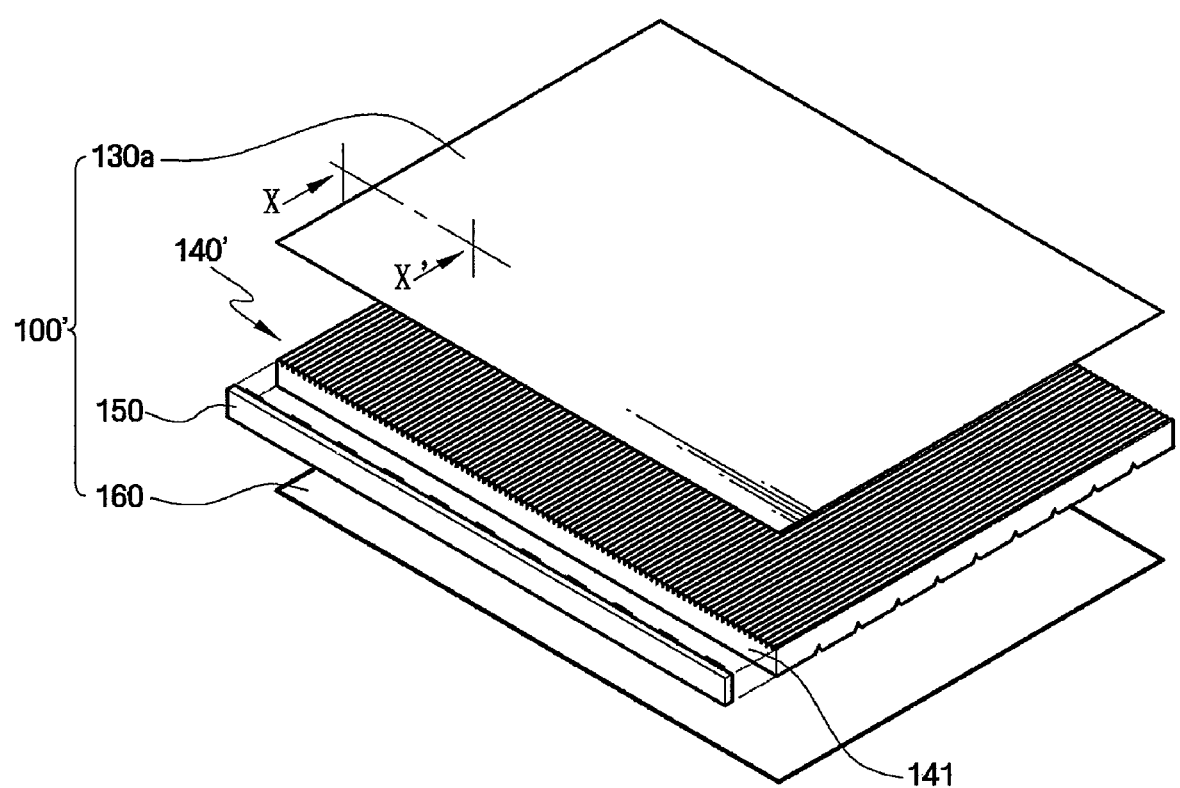
FIG. 9 is an exploded perspective view of a backlight assembly according to a fourth embodiment of the present invention.
Figure 10:
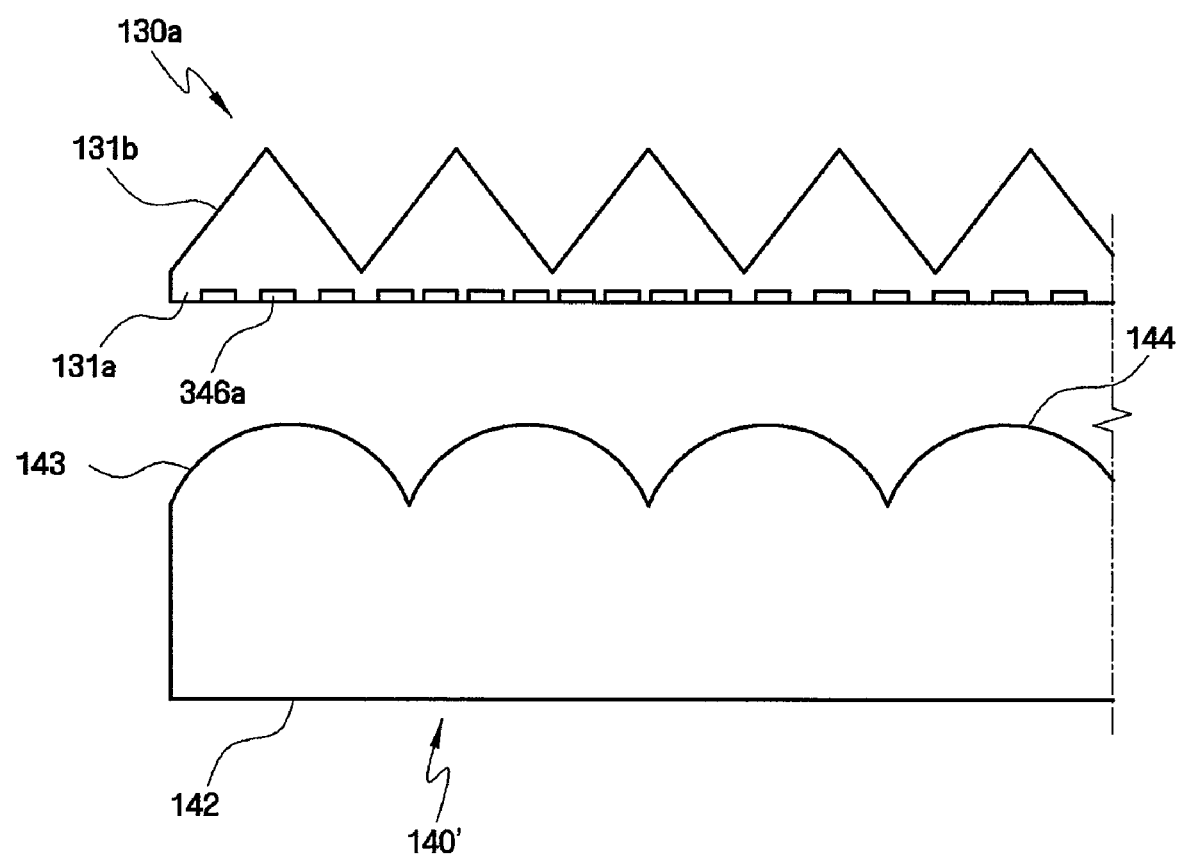
FIG. 10 is a sectional view taken along line X-X' of FIG. 9.
Figure 11:
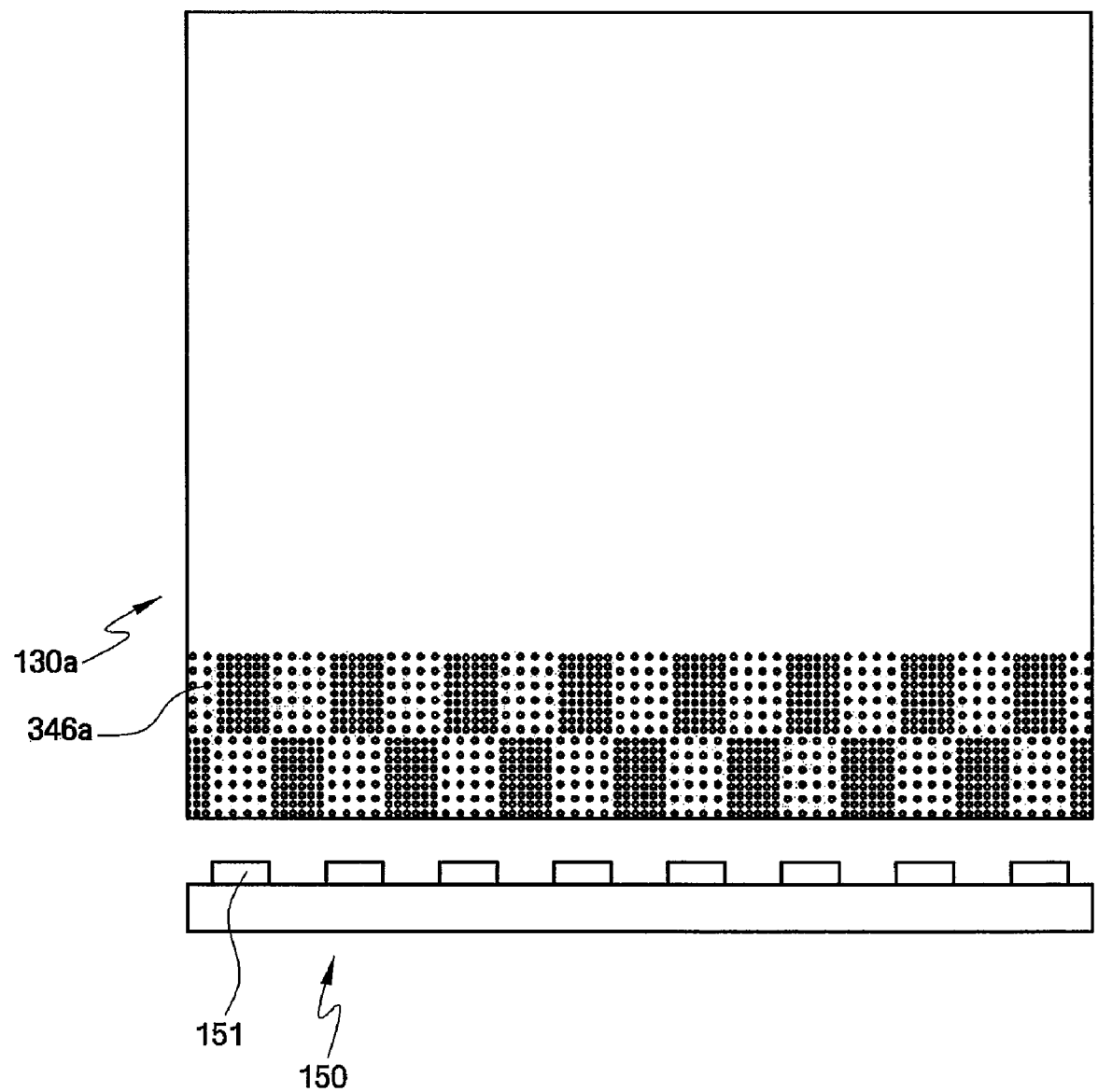
FIG. 11 is a rear view of a prism sheet of the backlight assembly of FIG. 9.
Figure 12:
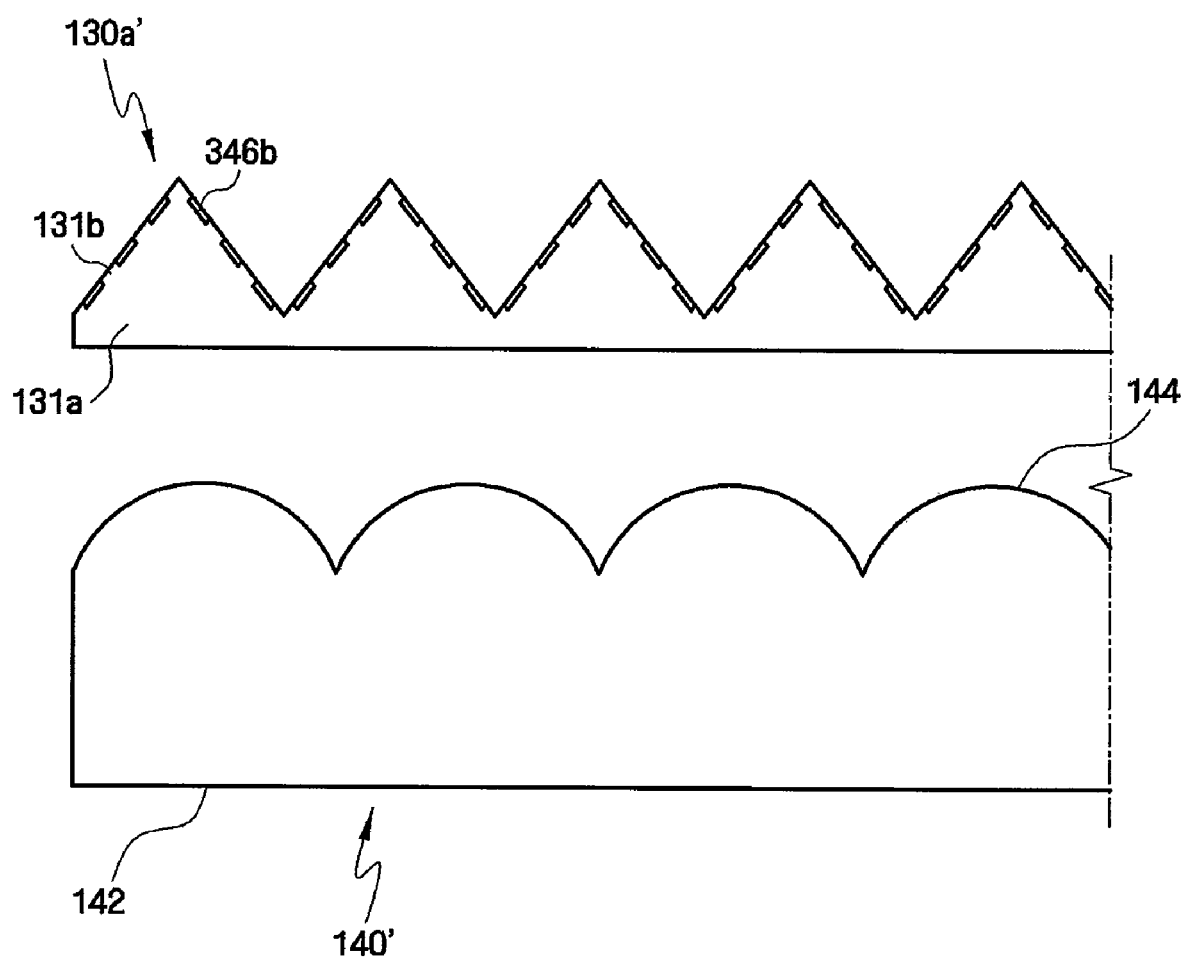
FIG. 12 shows a modified embodiment of the backlight assembly of FIG. 10.

A backlight assembly according to a fourth embodiment of the present invention will hereinafter be described with reference to FIGS. 9 through 12. FIG. 9 is an exploded perspective view of a backlight assembly according to a fourth embodiment of the present invention, FIG. 10 is a sectional view taken along line X-X' of FIG. 9, FIG. 11 is a rear view of a prism sheet of the backlight assembly of FIG. 9, and FIG. 12 shows a modified embodiment of the backlight assembly of FIG. 10.

The backlight assembly 100' according to the fourth embodiment of the present invention includes a prism sheet 130a, the light guide plate 140', the light source unit 150 having light sources 151, and the reflective sheet 160.

The light guide plate 140' guides the light supplied by the light sources 151 to the liquid crystal panel assembly 20 (see FIG. 1), and is made of a panel formed of a plastic-based transparent material such as an acrylic material. The light guide plate 140' functions such that light emitted from the light sources 151 is directed to the liquid crystal panel 30 (see FIG. 1) which is disposed above the light guide plate 140'.

The light guide plate 140' includes the light incident surface 141, the upper surface 143, the lower surface 142, the concave portions 145, and the prism pattern 144. The light incident surface 141 is formed on one side surface of the light guide plate 140' and is adjacent to the light sources 151 so that light passes into the light guide plate 140' through the light incident surface 141. The upper surface 143 is perpendicular to the light incident surface 141 and includes the prism pattern 144. The lower surface 142 opposes the upper surface 143 and includes a plurality of the concave portions 145.

The light guide plate 140' includes various patterns such that light entering into the light guide plate 140' through the light incident surface 141 is directed toward the liquid crystal panel 30 (see FIG. 1). Such patterns may include the concave portions 145 that are formed with inclined surfaces.

The prism sheet 130a is disposed above the light guide plate 140' and focuses the light transmitted through the light guide plate 140'. The prism sheet 130a is formed with triangular prisms in a predetermined arrangement in an upper surface thereof such that light supplied from the light guide plate 140' is focused vertically onto the liquid crystal panel 30 (see FIG. 1). Accordingly, most of the light passing through the prism sheet 130a travels vertically such that the luminance distribution on the protection sheet (not shown) is uniform. The prism sheet 130a includes a first surface 131a, and a second surface 131b opposing the first surface 131a and on which the prism pattern is formed. A diffusing pattern 346a may be formed on the first surface 131a.

The diffusing pattern 346a adjusts the light supplied from the light guide plate 140' that may be non-uniform so that the light becomes uniform. The diffusing pattern 346a may be formed only in an area proximate to the light incident surface 141 of the light guide plate 140'. Further, the density of the diffusing pattern 346a may be varied depending on the positioning of the light sources 151 (assuming a plurality of the same), the distance from the light sources 151, and the thickness of the light guide plate 140'.

The reflective sheet 160 is disposed under the light guide plate 140' to reflect light that is downwardly directed from the light guide plate 140' back in an upward direction. The reflective sheet 160 reflects light that is not reflected by the lower surface 142 of the light guide plate 140 and by the concave portions 145 formed therein, and that passes through light guide plate 140', such that this light re-enters the light guide plate 140' and possibly passes completely therethrough to the liquid crystal panel 30 (see FIG. 1). Hence, the reflective sheet 160 reduces loss of the light emitted from the light source 151 and further enhances the uniformity of the light supplied to the liquid crystal panel 30 (see FIG. 1).

FIG. 11 is a rear view of the prism sheet of the backlight assembly of FIG. 9. The diffusing pattern 346a as shown in FIG. 11 includes areas of high density and areas of low density arranged in the matrix pattern described with reference to the second exemplary embodiment of the invention. The matrix pattern may, alternatively be form on the upper surface 131b of the prism sheet 130a.

Referring to FIG. 12, in the modified embodiment of the backlight assembly 100' of the fourth embodiment, the prism sheet 130a' includes the first surface 131a, and the second surface 131b opposing the first surface 131a and which includes the prism pattern. Further, in this modified embodiment, the diffusing pattern 346b is formed on the second surface 131b, i.e., the diffusing pattern 346b is formed on the prism pattern of the second surface 131b.

Figure 13:
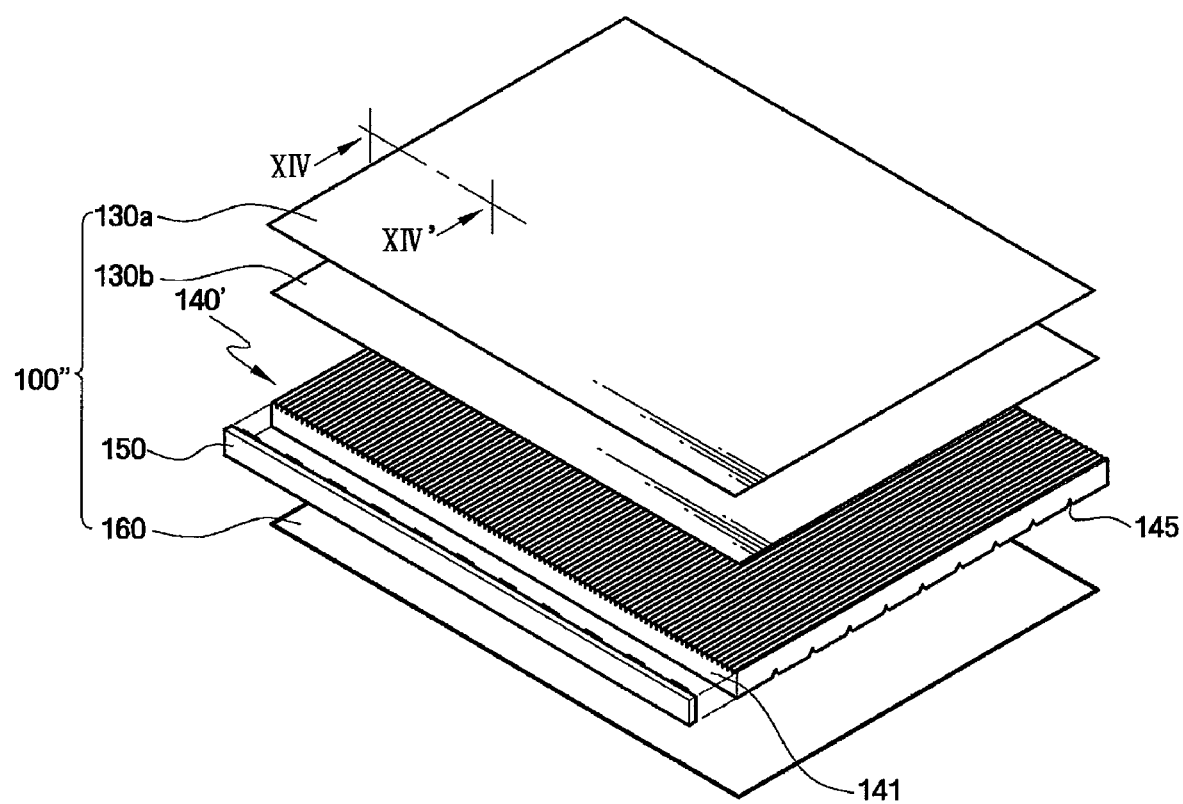
FIG. 13 is an exploded perspective view of a backlight assembly according to a fifth embodiment of the present invention.
Figure 14:
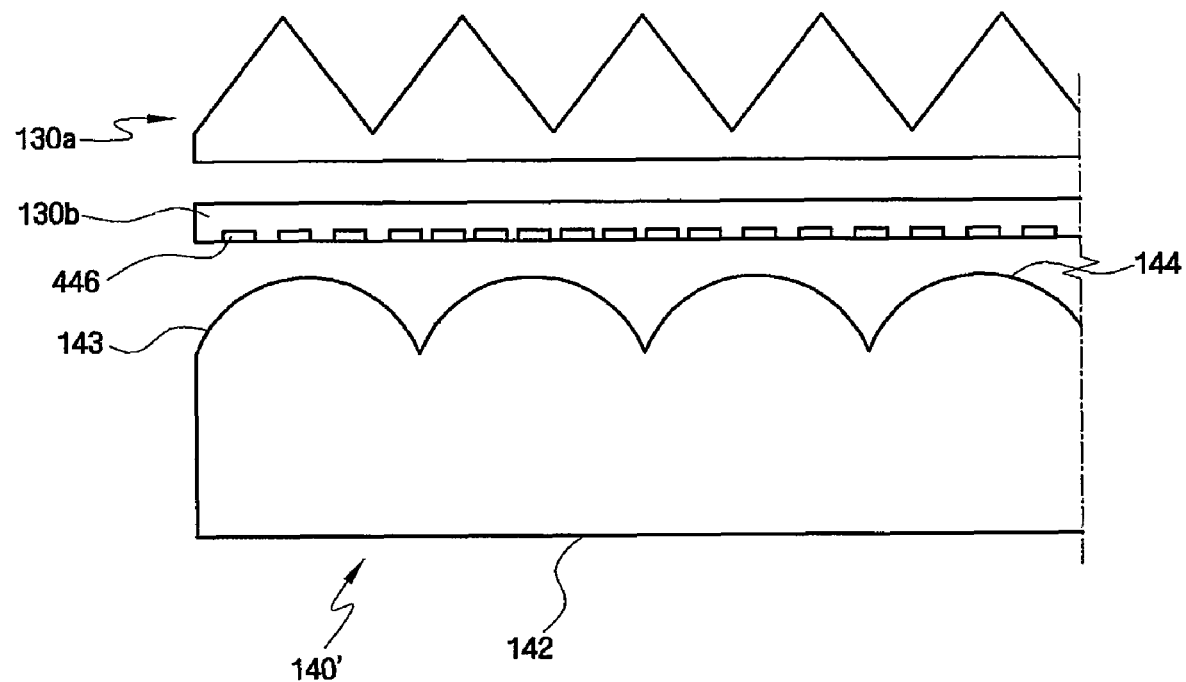
FIG. 14 is a sectional view taken along line XIV-XIV' of FIG. 13.
Figure 15:
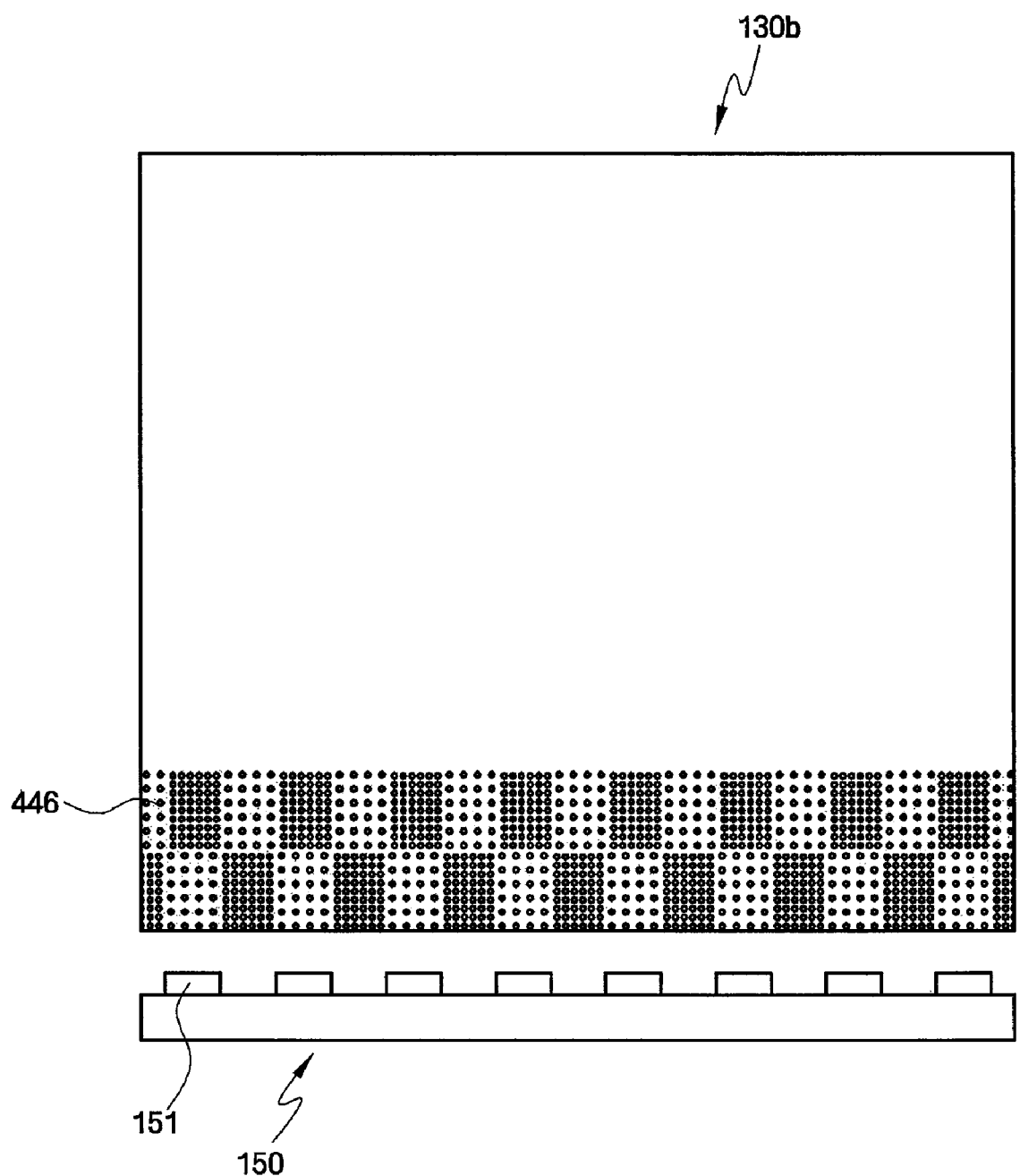
FIG. 15 is a rear view of a diffusion sheet of the backlight assembly of FIG. 13.

A backlight assembly according to a fifth embodiment of the present invention will hereinafter be described with reference to FIGS. 13 through 15. FIG. 13 is an exploded perspective view of a backlight assembly according to a fifth embodiment of the present invention, FIG. 14 is a sectional view taken along line XIV-XIV' of FIG. 13, and FIG. 15 is a rear view of a diffusion sheet of the backlight assembly of FIG. 13.

The backlight assembly 100" according to the fifth embodiment of the present invention includes the prism sheet 130a, a diffusion sheet 130b, the light guide plate 140', the light source unit 150 having the light sources 151, and the reflective sheet 160.

The light guide plate 140' guides the light supplied by the light sources 151 to the liquid crystal panel assembly 20 (see FIG. 1), and is made of a panel formed of a plastic-based transparent material such as an acrylic material. The light guide plate 140' functions so that light emitted from the light source 151 is directed to the liquid crystal panel 30 (see FIG. 1) which is disposed above the light guide plate 140'. The light sources 151 may be a single light source.

The light guide plate 140' includes the light incident surface 141, the upper surface 143, the lower surface 142, the concave portions 145, and the prism pattern 144. The light incident surface 141 is formed on one side surface of the light guide plate 140' and is adjacent to the light sources 151 so that light passes into the light guide plate 140' through the light incident surface 141. The upper surface 143 is perpendicular to the light incident surface 141 and includes the prism pattern 144. The lower surface 142 opposes the upper surface 143 and includes a plurality of the concave portions 145.

The light guide plate 140' includes various patterns such that light entering into the light guide plate 140' through the light incident surface 141 is directed toward the liquid crystal panel 30 (see FIG. 1). Such patterns may include the concave portions 145 that are formed with inclined surfaces.

The diffusion sheet 130b and the prism sheet 130a are disposed above the light guide plate 140' such that light transmitted through the light guide plate 140' is diffused and focused. The diffusion sheet 130b diffuses the light irradiated from the light guide plate 140' to prevent the concentration of light in some areas. The prism sheet 130a is formed with triangular prisms in a predetermined arrangement on an upper surface thereof such that light which is dispersed by the diffusion sheet 130b is focused vertically onto the liquid crystal panel 30 (see FIG. 1). Accordingly, most of the light passing through the prism sheet 130a travels vertically such that the luminance distribution on a protection sheet (not shown) is uniform. The protection sheet protects the surface of the prism sheet 130a, and further disperses light to enhance light distribution uniformity.

The diffusion sheet 130b includes a diffusing pattern 446. The diffusing pattern 446 adjusts the light supplied from the light guide plate 140' that may be non-uniform so that the light becomes uniform. The diffusing pattern 446 may be formed only in an area proximate to the light incident surface 141 of the light guide plate 140'. Further, the density of the diffusing pattern 446 may be varied depending on the positioning of the light sources 151 (assuming a plurality of the same), the distance from the light sources 151, and the thickness of the light guide plate 140'.

In FIG. 14, the diffusing pattern 446 is shown on the lower surface of the diffusion sheet 130b. Alternatively the diffusing pattern may be formed on the upper surface of the diffusion sheet 130b.

The reflective sheet 160 is disposed under the light guide plate 140' to reflect light that is downwardly directed from the light guide plate 140' back in an upward direction. The reflective sheet 160 reflects light that is not internally reflected by the lower surface 142 of the light guide plate 140 and by the concave portions 145 formed therein, and that passes through light guide plate 140', such that this light re-enters the light guide plate 140' and possibly passes completely therethrough to the liquid crystal panel 30 (see FIG. 1). Hence, the reflective sheet 160 reduces loss of the light emitted from the light source 151 and further enhances the uniformity of the light supplied to the liquid crystal panel 30 (see FIG. 1).

FIG. 15 shows a rear view of a diffusion sheet of the backlight assembly of FIG. 13. In FIG. 15, a matrix pattern on the lower surface of the diffusion sheet 130b is shown. The matrix pattern is described in connection with the second exemplary embodiment of the invention. The matrix pattern may alternatively be formed on the upper surface of the diffusion film.

While the present disclosure of invention has been particularly provided with reference to exemplary embodiments, it will be understood in light of the disclosure and by those of ordinary skill in the art that various changes in form and details may be made therein without departing from the spirit and scope of the present teachings.

What is claimed is:

1. A backlight assembly comprising:
    a light source unit which generates light; and
    a light guide plate which comprises
        an incident light surface through which the light from the light source unit enters the light guide plate,
        an upper surface joined to the incident light surface and that includes a prism pattern, and
        a lower surface opposing the upper surface, the lower surface including a plurality of concave portions,
    wherein a diffusing pattern is formed on one of the upper surface and the lower surface,
    wherein the plurality of concave portions are formed in a channel-shaped configuration and extend along the same direction as the light incident surface,
    wherein the diffusing pattern comprises areas of high density of the diffusing pattern and areas of low density of the diffusing pattern, and wherein the areas of high density of the diffusing pattern and areas of low density of the diffusing pattern are alternately arranged on one of the upper surface and the lower surface.

2. The backlight assembly of claim 1, wherein the diffusing pattern is formed on the prism pattern.

3. The backlight assembly of claim 1, wherein the diffusing pattern is formed on the lower surface.

4. The backlight assembly of claim 1, wherein each of the concave portions comprises a first inclined surface and a second inclined surface that are inclined at an oblique angle to the lower surface.

5. The backlight assembly of claim 1, wherein the areas of high density of diffusing pattern and the areas of low density of diffusing pattern are arranged in a matrix pattern.

6. The backlight assembly of claim 5, wherein the light source unit comprises a plurality of light sources, the light sources being spaced apart in a row, and the matrix pattern comprises a first row disposed adjacent to the light source unit, the first row including areas of low density of the diffusing pattern disposed opposite the light sources and areas of high density of the diffusing pattern disposed opposite spaces between the light sources.

7. The backlight assembly of claim 5, wherein the light source unit comprises a plurality of light sources, the light sources being spaced apart in a row, and the matrix pattern comprises a first row disposed adjacent to the light source unit, the first row including areas of high density of the diffusing pattern disposed opposite the light sources and areas of low density of the diffusing pattern disposed opposite spaces between the light sources.

8. The backlight assembly of claim 1, wherein the diffusing pattern is formed uniformly within an area that extends to a predetermined distance from the light incident surface.

9. The backlight assembly of claim 8, wherein the predetermined distance is less than or equal to approximately 70 mm.

10. A backlight assembly comprising:
a light source unit which generates light;
a light guide plate which comprises
an incident light surface through which the light from the light source unit enters the light guide plate,
an upper surface joined to the incident light surface and that has a prism pattern, and
a lower surface opposing the upper surface, the lower surface including a plurality of concave portions;
and an optical sheet disposed above the light guide plate, the optical sheet comprising a first surface and a second surface opposing the first surface,
wherein a diffusing pattern is formed on one of the first surface and the second surface,
wherein the plurality of concave portions are formed in a channel-shaped configuration and extend along the same direction as the light incident surface,
wherein the diffusing pattern comprises areas of high density of the diffusing pattern and areas of low density of the diffusing pattern, and
wherein the areas of high density of the diffusing pattern and areas of low density of the diffusing pattern are alternately arranged on one of the upper surface and the lower surface.

11. The backlight assembly of claim 10, wherein the diffusing pattern is formed on the optical sheet.

12. The backlight assembly of claim 10, wherein the regions of high density of the diffusing pattern and the regions of low density of the diffusing pattern being are arranged in a matrix pattern.

13. The backlight assembly of claim 12, wherein the light source unit comprises a plurality of light sources, the light sources being spaced apart in a row, and the matrix pattern comprises a first row disposed adjacent to the light source unit, the first row including areas of low density of the diffusing pattern disposed opposite the light sources and areas of high density of the diffusing pattern disposed opposite spaces between the light sources.

14. The backlight assembly of claim 12, wherein the light source unit comprises a plurality of light sources, the light sources being spaced apart in a row, and the matrix pattern comprises a first row disposed adjacent to the light source unit, the first row including areas of high density disposed opposite the light sources and areas of low density of the diffusing pattern disposed opposite spaces between the light sources.

15. The backlight assembly of claim 10, wherein the diffusing pattern is formed uniformly within an area that is a predetermined distance from the light incident surface.

16. The backlight assembly of claim 10, wherein the optical sheet comprises at least one of a prism sheet and a diffusion sheet.

17. A display device comprising:
a display panel which displays an image; and
a backlight assembly which comprises
a light source unit that supplies light to the display panel,
a light guide plate that includes an incident light surface through which the light from the light source unit enters the light guide plate, an upper surface joined to the incident light surface and that has a prism pattern, and a lower surface opposing the upper surface and formed with a plurality of concave portions, and
an optical sheet disposed above the light guide plate,
wherein a diffusing pattern is formed on one of the light guide plate and the optical sheet,
wherein the plurality of concave portions are formed in a channel-shaped configuration and extend along the same direction as the light incident surface,
wherein the diffusing pattern comprises areas of high density of the diffusing pattern and areas of low density of the diffusing pattern, and
wherein the areas of high density of the diffusing pattern and areas of low density of the diffusing pattern are alternately arranged on one of the upper surface and the lower surface.

18. The display device of claim 17, wherein the optical sheet comprises at least one of a prism sheet and a diffusion sheet.

19. The display device of claim 17, wherein the diffusing pattern comprises areas of high density of the diffusing pattern and areas of low density of the diffusing pattern, the areas of high density and the regions of low density being arranged in a matrix pattern.

* * * * *